3,116,206
ENCAPSULATION PROCESS AND ITS PRODUCT
Carl Brynko and Joseph A. Bakan, Dayton, Ohio, assignors to The National Cash Register Company, Dayton, Ohio, a corporation of Maryland
No Drawing. Filed Dec. 22, 1961, Ser. No. 161,395
4 Claims. (Cl. 167—83)

This invention relates to a process for making minute capsules having walls of polymeric material of substantial zein content enclosing water-immiscible core material, and to the capsule product. Zein, broadly considered, is a prolamine film-former derived from the seeds of zea maya, a grain commonly called—Indian corn, by the alcohol-extraction thereof from gluten recovered from the seed contents in the manufacture of starches. In this specification, "zein" is used to means such alcohol-extracted zein that has had its oil content removed and is made alkaline, as by the treatment of the alcohol solution with sodium hydroxide to where the solution has a pH of 9 to 11, after which treatment certain contaminating components insolubilized thereby are filtered out. The remaining zein content of the alcohol solution is precipitated by treatment with cool water, dried, comminuted, and screened to the desired particles size. Such particulate zein may be commercially obtained, now, from Corn Products Refining Company of Pekin, Illinois, one of the United States of America, under the designation "G200," which will be called "the specified zein." The particular mode of extraction of the zein is not of paramount importance so long as the zein may be dissolved in an alkaline aqueous solution to about 10 to 11 percent concentration of zein, by weight. On treatment of such an aqueous solution by lowering its pH, the zein is precipitated as a highly hydrated (solvated) insoluble material, which precipitation generally occurs as a pH of 5 is reached, or lower, depending on the other components that may be provided, such as negatively charged film-forming polymeric materials which aid in such precipitation and become part of the wall material.

The encapsulation of small particles of water-immiscible material, either liquid, solid, or mixtures thereof, may be carried on in such an alkaline aqueous solution of the zein at room temperature, with or without other wall-forming components. The core particles to be encapsulated are dispersed in the solution and kept dispersed while the pH of the solution-dispersion is lowered until the zein content and other wall-forming contents, if any are used, are precipitated and form walls around the particles of core material, as seed points, as a solvated seamless solid coating which later may be consolidated and made rigid by treatment with cross-linking agents, such as the aldehyde class of compounds commonly used for the cross-linking of proteins.

To facilitate the precipitation of the zein, by the lowering of the pH of the aqueous system, there may be added to the system other polymeric materials, of artificial or natural origin, which usually have a negative electric charge in aqueous solution or become negatively charged upon lowering the pH of such a solution into the acid range. Inasmuch as the zein in aqueous solution is precipitated out as a solvated separate phase of more or less non-liquid character by lowering the pH of the solution, from a normal 9 to 11 reading, to an acid condition lower than pH 5.5, it is not a coacervate phase separation, inasmuch as a coacervate phase is a rich liquid solution instead of being a solvated solid.

The characteristics of the dispersed intended core material are not critical except as to their property of being insoluble in the aqueous vehicle and of being nonreactive with the wall-forming contents thereof. Therefore, if liquid, the intended core material would be classified as an "oil" and in an aqueous dispersion would be globular droplet form, such as is true in oil and water emulsions. Oils that can be thus emulsified are of an infinite, variety including animal, vegetable, fish, mineral, and synthetic oils as typified, respectively, by lard oil, castor oil, sperm oil, petroleum distillates, and trichlorodiphenyl. These oils may be used alone or have dispersed in them solid materials, such as oil-insoluble medicines typified by aspirin, minerals as typified by magnetic iron oxide, or oil-insoluble dye particles. In addition, the oil may have dissolved in it oil-soluble vitamins, foods, medicines, oil-soluble dyes, etc. The core particles, instead of being liquid, may be entirely solid and of various configurations as regards the particles, be they crystalline or amorphous, the departure from the globular state of liquid dispersions not being consequential, as the resultant capsules will partake somewhat of the exterior configurations of the solid particles as comminuted. Mixed dispersions of different kinds of oils, different kinds of solds, or mixtures thereof may be encapsulated in a single batch operation, or capsules of different batches distinguished by different core materials may be mixed.

It is within the scope of the process to utilize particles ranging from 5 microns to several thousand microns in average dimension, such being particles of such a small size as to make the individual handling of them, for encapsulation, impractical or impossible. There is a tendency for the particles of intended core material as covered by the precipitation but unhardened deposit of the wall material to aggregate somewhat, in botryoid groups, according to the conditions of manufacture. Such aggregation may be considered the rule, although unaggregated capsules may form in rare instances. Such aggregate groups may consist of 5 to 100 or more encapsulated particles, which aggregates, in spite of the numbers of the units therein, ordinarily are invisible to the unaided eye, as otherwise they would never survive the agitation of the system.

It is to be understood that the capsule-forming materials are introduced into a relatively large amount of aqueous manufacturing vehicle to afford free mobility of capsule forming material entities, the vehicle being kept in constant agitation until the completion of the capsules, so that the precipitated and dispersed capsule-forming materials will be interspersed as minute entities free to combine and form the capsules and aggregates, without forming a coagulated unusable mass.

It will be considered that the novel process is carried on at normal room temperature (20 degrees to 25 degress centigrade), unless otherwise specified, but temperature range is not of a great importance until temperatures of congealing and vaporization of the capsule-forming materials are reached.

The invention will be described specifically with various examples which involve the encapsulation of trichlorodiphenyl droplet particles, because such is a readily-emulsified liquid oil, at room temperature of generally chemically inert properties, not subject to evaporation at manufacturing temperatures which vary greatly from normal temperature, artificially contrived or naturally occurring. Materials which are sensitive to warmth or cold for their preservation may be encapsulated and it is not to be inferred otherwise by specifying the trichlorodiphenyl in the examples.

The particular components used as exemplary are not to be deemed to limit the claimed scope of the invention as, in addition to the equivalent core materials mentioned to substitute for the trichlorodiphenyl, additions to the zein wall material content in the class of artificial or natural negatively polymeric materials as cooperating wall materials may be used with zein to facilitate its deposition and to form a part of the capsule walls, as will be described.

*Example I*

Into a vessel is introduced 100 milliliters of a 2 percent, by weight, solution of the specified zein in water, and 10 milliliters of trichlorodiphenyl, with agitation to produce an emulsion, and with concurrent adjustment of the pH to 11, which adjustment may be brought about with an aqueous sodium hydroxide solution. Blending is proceeded with for about 10 minutes to bring the system to a uniform droplet dispersion of the trichlorodiphenyl, and with continued agitation there is introduced 100 milliliters of a 5 percent, by weight, solution of sodium carboxymethyl-cellulose in water, adjusted to the desired pH 11. After the thorough incorporation of the negatively charged sodium carboxymethyl-cellulose there is added 200 milliliters of water. Then the system is adjusted to a pH of 4 with 10 percent, by weight, aqueous acetic acid solution. At this time, the polymeric materials will have precipitated and will form on the droplet particles of core material to form solvated solid walls. Thereafter the walled droplets form into botryoid aggregates of under 100 microns in largest dimension, the droplets of the core material being individually surrounded by the wall material. All of the foregoing has been performed in a room temperature environment.

To rigidize the deposited wall material, there is added to the system, still with agitation, 5 milliliters of a 25 percent, by weight, aqueous glutaraldehyde solution, the agitation being continued for up to 10 hours to obtain uniform and adequate cross-linking. These capsules then may be recovered by filtering, decantation, centrifuging, or like process and treated as substantially dry, solid, powdery particulate material.

*Example II*

The process for Example II is the same as that for Example I except that for the glutaraldehyde there is substituted an equivalent amount of alpha-hydroxyadip-aldehyde.

*Example III*

This process is the same as in Example I except that for the sodium carboxymethyl-cellulose there is substituted an equal amount of polyvinylpyrrolidone with the acid pH thereof adjusted to 5.5 to cause the precipitation thereof.

*Example IV*

The process of this example is that of Example I except that there is substituted for the sodium carboxymethyl-cellulose an equal amount of polyvinylmethylethermaleic anhydride.

In each of these Examples I to IV there may be successive additional steps of wall-hardening performed to gain a super-hardened effect.

*Example V*

In this example, a modification of the specified zein is used, namely zein which has been treated with strong acids to deaminate it, so that it dissolves in an aqueous solution vehicle at a pH of 9, thus accommodating core materials which are sensitive to the higher pH 11 conditions of the first four examples. In addition, in this example no negatively charged polymeric material is used. To 200 milliliters of 5 percent, by weight, aqueous solution of the deaminated specified zein is added 10 milliliters of trichlorophenyl and 290 milliliters of water, the system being adjusted to pH 9. With constant agitation, and after the drop size has been reduced to the desired average diameter, the pH is dropped to 5.4 with 20 percent, by weight, aqueous solution of acetic acid. As before, the capsules, with the walls unhardened, will form and later aggregate. Thereafter the wall material may be rigidized by glutaraldehyde treatment, as by constantly stirring the capsules and aggregates thereof for some hours with an added 5 milliliters of a 25 percent, by weight, aqueous glutaraldehyde solution. In this example, the capsule walls are formed entirely of rigidized zein precipitate of the deaminated specified type.

*Example VI*

In this example 100 millilters of the zein solution of Example V and 26 milliliters of a 5 percent, by weight, aqueous solution of gum arabic, are agitated at pH 11.5 with 92 grams of water and the specified trichlorodiphenyl core material in the amount of 10 milliliters. After the desired drop size is reached, the pH is reduced to 4.7 by a 20 percent, by weight, aqueous solution of acetic acid. This results in capsules which aggregate, the wall materials of which may be hardened by agitation, for some hours, after the introduction of 2½ milliliters of a glutaraldehyde aqueous solution and the same amount of an alpha-hydroxyadip-aldehyde aqueous solution, each of 25 percent, by weight, concentration.

*Example VII*

Emulsify 25 milliliters of trichlorodiphenyl in 227.5 grams of a 9 percent, by weight, aqueous solution of the deaminated specified zein of Example V, after which is added, after and during continued agitation 500 milliliters of a 5 percent, by weight, aqueous solution of polyvinylmethylethermaleic anhydride, or if desired a similar concentration of polyethylenemaleic anhydride of about 31,000 molecular weight, and to such system is added, and stirred in, 200 milliliters of water with the total system kept from the beginning at about pH 11. The temperature then is reduced to 10 degrees centigrade and at the same time the pH is reduced to 4.7, by the methods heretofore described, which induces the formation of heavy-walled capsules in small aggregates, due to the increased viscosity of the solution. To rigidize the deposited walls of the polymeric material, there is introduced into 200 milliliters of the aqueous vehicle and contents, 10 milliliters of a 25 percent, by weight, aqueous solution of glutaraldehyde, 10 milliliters of a 30 percent, by weight, aqueous solution of formaldehyde, and 10 grams of sodium chloride and such stirred for 2 to 3 hours, during which time temperature is raised to 55 degrees centigrade. This is followed by a slow cooling of the system and recovery of the capsules as before-described.

The foregoing specific examples of the process can be modified to suit the particular needs with respect to any particular selected core materials, and there may be substituted other negative polymeric materials than those mentioned to aid in the formation of the capsule walls.

What is claimed is:

1. A process for the en masse manufacture of minute capsules and aggregates thereof in a non-gelable film-forming material that is soluble in aqueous media at room temperature, the capsules each consisting of core materials contained as particles retained in encasing walls of zein, including the steps of
    (a) forming an aqueous solution of zein at a pH of approximately 11 at a temperature of between 15 degrees centigrade and 55 degrees centigrade;
    (b) dispersing intended core materials as particulate entities in solution (a) by agitation thereof together;
    (c) lowering the pH of the system of (a) plus (b), with continued agitation to below 5.5 to phase-separate the zein as solvated entities of solid material which deposit around each core entity as a solvated solid wall; and
    (d) cross-linking the deposited wall material to form a rigid wall material which is water insoluble, by treating the capsules with a cross-linking agent for zein.

2. Capsules made according to the process of claim 1.

3. A process for the en masse manufacture of minute capsules and aggregates thereof in a non-gelable film-forming material soluble in aqueous media at room temperature, the capsules each consisting for core materials contained as particles retained in encasing walls of deaminated zein, including the steps of
   (a) forming an aqueous solution of deaminated zein at a pH of approximately 9 at a temperature of between 15 degrees centigrade and 55 degrees centigrade;
   (b) dispersing intended core materials as particulate entities in solution (a) by agitation thereof together;
   (c) lowering the pH of the system of (a) plus (b), with continued agitation to below 5.5 to phase-separate the zein as a solvated entities solid material which deposits around each core entity as a solvated solid wall; and
   (d) cross-linking the deposited wall material to form a rigid wall material which is water insoluble, by treating the capsules with a cross-linking agent for deaminated zein.

4. Capsules made according to the process of claim 3.

References Cited in the file of this patent

UNITED STATES PATENTS

| | | |
|---|---|---|
| 2,897,120 | Cronin et al. | July 28, 1959 |
| 2,954,322 | Heilig | Sept. 27, 1960 |
| 3,016,308 | Macaulay | Jan. 9, 1962 |
| 3,041,289 | Katchen et al. | June 26, 1962 |